(No Model.)
J. HUGHES.
SEPARATING GREASE FROM WATER.
No. 386,402. Patented July 17, 1888.
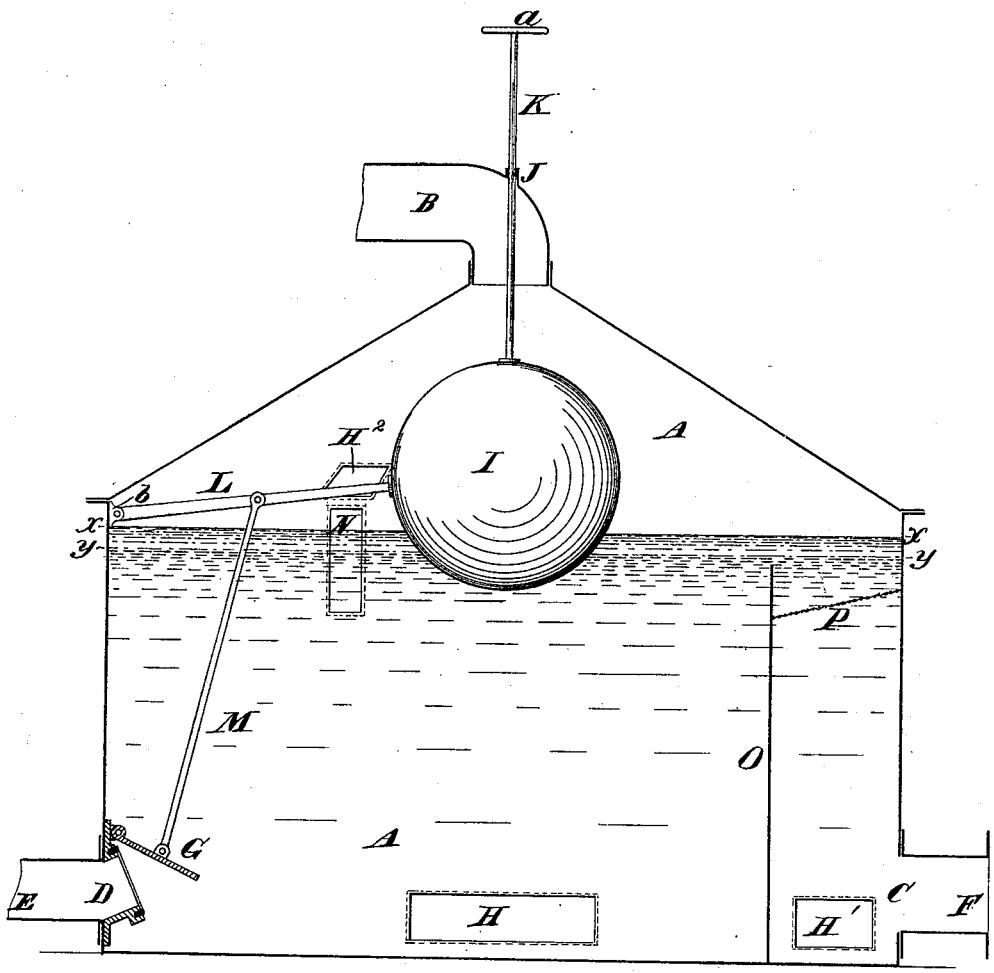
Witnesses:
Joseph W. Roe.
C. L. Sundgren.
Inventor:
James Hughes.
by attorneys
Brown & Hall.

United States Patent Office.

JAMES HUGHES, OF NEW YORK, N. Y., ASSIGNOR OF ONE-HALF TO CORNELIUS H. DE LAMATER, OF SAME PLACE.

SEPARATING GREASE FROM WATER.

SPECIFICATION forming part of Letters Patent No. 386,402, dated July 17, 1888.

Application filed June 8, 1888. Serial No. 276,495. (No model.)

*To all whom it may concern:*

Be it known that I, JAMES HUGHES, of the city and county of New York, in the State of New York, have invented a new and useful Improvement in Apparatus for Extracting Grease from Water, of which the following is a specification.

The object of my invention is to provide very simple and efficient means for extracting grease from water, as from the waters of condensation of a steam-engine after such waters leave the air-pump and before they enter the hot-well; and to that end my invention consists of an apparatus which, with reference to the accompanying drawing, I shall now proceed to describe, and the novel features of which I will point out in claims.

The drawing is a longitudinal vertical sectional view representing an apparatus embodying my improvement.

A indicates a tank of suitable material, as of boiler-iron, and of suitable form—as, for example, that of a hollow rectangular prism, as indicated in the drawing, having a flat bottom and top tapering or slanting inward and upward to join the grease-discharge pipe B.

C is an inlet-opening through which a stream of greasy water may enter the tank; D, an outlet-opening through which the water deprived of its grease escapes from the tank to the hot-well of the engine, or to any suitable place.

F represents an inlet-pipe for conducting the greasy water to the opening C.

G is a suitable valve, by closing which the exit of water from the tank through the outlet D is prevented. In this example the valve G is a flat plate hinged to a seat secured to the inside of the tank, through which seat the outlet-opening D is prolonged, as is represented in the drawing. The inlet-opening C and the outlet-opening D are located at a level somewhat above the bottom of the tank, to permit any heavy material brought in with the water to settle on or near the bottom below the level of said opening.

H and H' are hand-hole plates, which may be taken off for the purpose of removing the sediment deposited on or near the bottom.

I is a float of suitable construction—as, for example, a light hollow sphere of thin iron. The float I rests upon the surface of the liquid in the tank, and is raised or lowered by the liquid as that surface rises or falls. The line $x$ $x$ represents the normal level of the surface of the liquid in the tank. The level is maintained by the amount of opening of the valve, which is regulated by the float, the rise of which will give greater opening to the valve, and the fall of which will reduce the opening.

Projecting upward from the float I, and secured thereto and passing through a loosely-fitted guide opening, J, and extending above the highest part of the apparatus, as through the top of the tank or grease-discharge pipe B, is a hand-rod, K, by which the float I may be pushed down or lifted up by the hand of an attendant. The hand-rod K may be provided with a suitable handle, $a$.

The float I and valve G are so connected with each other, as by lever L and rod M, that when the surface of the liquid in the tank is at its normal level the valve G will be open, and when the float drops or is pushed down sufficiently below that level the valve G will be closed. One extremity of the lever L is attached to the float, and the other extremity or fulcrum is jointed to a lug, $b$, attached to the side of the tank on or near the line $x$ $x$ and immediately over the valve G. The rod M forms a direct jointed connection between a central point in the lever L and the valve G.

N is a glass-covered opening or aperture in the side of the tank, extending above and below the line $x$ $x$, by means of which the interior of the tank can be inspected from the outside.

$H^2$ is a hand-hole plate covering an opening in the tank just above the opening N. By removing the plate $H^2$ access is had to the inner face of the glass covering of opening N.

O is a vertical division-plate or partition extending quite across the tank and upward toward the line $x$ $x$, terminating at a distance below that line. The partition O directs the stream of liquid entering the tank through the opening C upward. It is located at such a distance from the inlet-opening that the water entering the tank is checked in velocity and distributed laterally, filling the compartment of the tank thus formed between the partition and the side of the tank in which the inlet-opening is situated.

P is a perforated or reticulated diaphragm secured across the upward passage, space, or compartment between the partition O and the side of the tank in which the inlet-opening is located. Perforated metallic plates or sheets, or wire gauze or netting, are suitable materials for forming the diaphragm P.

The stream of water and grease entering the tank, as from an air-pump of a steam-engine, is deflected by the partition O upward, and is checked in velocity and distributed laterally before passing over the top of the partition, and the currents and agitations of the said upward-flowing stream are broken up or equalized by contact with and in passing through the perforated or reticulated diaphragm P, and in a steady and uniform flow pass from that diaphragm upward and over the top of partition O into the larger compartment or body of the tank A. The body of liquid in the tank being in a state of comparative repose, or only gently agitated, any particles of solid matter heavier than the water will settle to the bottom, and the grease or oil will rise above the surface of the water and rest thereon. The line $y$ $y$ represents the surface of the water upon which the grease will rest, the level of which line will of course depend upon the proportion and quantity of water and grease in the tank. The water thus deprived of its grease or oil will flow out through the outlet-opening D to the hot-well or other receptacle. Whenever it is observed or ascertained that a considerable quantity of grease has accumulated on the surface of the water in the tank, or whenever it becomes desirable to discharge the grease which shall have then collected or accumulated thereon, the attendant, by pushing down on the hand-rod K, will cause the valve G to close the entrance to the outlet D, and the water, continuing to flow into the tank, will raise the accumulated grease or oil up and force it out through the grease-discharge pipe B into any suitable receptacle prepared to receive it.

What I claim as new, and desire to secure by Letters Patent, is—

1. An apparatus for extracting grease from water, consisting of a tank having inlet and outlet openings near its bottom and a grease-discharge pipe proceeding from its upper part, a valve applied to said outlet-opening, a float attached to said valve for controlling the opening of the same, and a hand-rod connected with said float and valve and projecting through an opening in the upper part of the tank for closing the said valve, substantially as herein described and set forth.

2. An apparatus for extracting grease from water, consisting of a tank having inlet and outlet openings near its bottom and a grease-discharge pipe proceeding from its upper part, and a partition across it, opposite the inlet-opening, for disturbing the entering stream of liquid and directing it upward, a regulating-valve applied to said outlet-opening, and a float attached to said valve for controlling the opening of the same, and a hand-rod connected with said float and valve and projecting through an opening in the upper part of the tank for closing the said valve, substantially as herein described and set forth.

3. An apparatus for extracting grease from water, consisting of a tank having inlet and outlet openings near its bottom and a grease-discharge pipe proceeding from its upper part, and a partition across it for distributing the entering stream of liquid and directing it upward, and a perforated or reticulated diaphragm on the inlet side of said partition for causing a steady and uniform flow of said stream, a regulating-valve applied to said outlet-opening, a float attached to said valve for controlling the opening of the same, and a hand-rod connected with said float and valve and projecting through an opening in the upper part of the tank for closing the said valve, substantially as herein described.

JAMES HUGHES.

Witnesses:
THOMAS J. RIDER,
C. C. CAPES.